United States Patent
Huo et al.

(10) Patent No.: US 8,018,551 B2
(45) Date of Patent: Sep. 13, 2011

(54) LIQUID CRYSTAL DISPLAY MODULE WITH REFLECTOR HAVING RAISED LAMP GUIDE

(75) Inventors: Dong-Im Huo, Gumi-si (KR); Jong-Kook Lee, Kyeongsan-si (KR)

(73) Assignee: LG Display Co. Ltd., Seoul (KR)

( * ) Notice: Subject to any disclaimer, the term of this patent is extended or adjusted under 35 U.S.C. 154(b) by 368 days.

(21) Appl. No.: 11/647,684

(22) Filed: Dec. 28, 2006

(65) Prior Publication Data
US 2007/0217218 A1    Sep. 20, 2007

(30) Foreign Application Priority Data
Mar. 16, 2006    (KR) .................. 10-2006-0024217

(51) Int. Cl.
*G02F 1/1335* (2006.01)
*F21V 7/04* (2006.01)
*F21V 5/00* (2006.01)

(52) U.S. Cl. ................ 349/61; 349/64; 349/67; 349/69; 349/70; 349/71; 362/559; 362/560; 362/561; 362/609

(58) Field of Classification Search ............ 349/60, 349/61, 64–71; 362/225, 255, 330, 551, 362/558–561, 600, 611, 613; 262/225, 255, 262/330, 551, 558–561, 600, 611, 613

See application file for complete search history.

(56) References Cited

U.S. PATENT DOCUMENTS

| 7,220,045 | B2 * | 5/2007 | Chang | 362/633 |
| 7,259,810 | B2 * | 8/2007 | Kim | 349/67 |
| 7,283,118 | B2 * | 10/2007 | Nagatani | 345/102 |
| 7,465,062 | B2 * | 12/2008 | Kwon | 362/225 |
| 2002/0030993 | A1 * | 3/2002 | Itoh | 362/246 |
| 2003/0058635 | A1 * | 3/2003 | Matsui | 362/97 |
| 2003/0227767 | A1 | 12/2003 | Lee et al. | |
| 2004/0012763 | A1 | 1/2004 | Yu et al. | |
| 2005/0248936 | A1 * | 11/2005 | Lee et al. | 362/217 |
| 2006/0104083 | A1 * | 5/2006 | Kwon | 362/559 |
| 2008/0212315 | A1 * | 9/2008 | Cornelissen et al. | 362/219 |

FOREIGN PATENT DOCUMENTS

JP    06-260010    9/1994

OTHER PUBLICATIONS

Office Action issued in corresponding Chinese Patent Application No. 200610168208X; issued Feb. 27, 2009.
Office issued in corresponding Chinese Patent Application No. 200610168208X; issued Jun. 5, 2009.

\* cited by examiner

*Primary Examiner* — Hoan C Nguyen
(74) *Attorney, Agent, or Firm* — Brinks Hofer Gilson & Lione (57) ABSTRACT

A liquid crystal display module displays an image on a liquid crystal panel. The liquid crystal module includes a liquid crystal panel and a backlight assembly. The backlight assembly includes a reflecting sheet having a raised portion that receives a light source and supports a diffusing sheet and/or optical sheet positioned between the liquid crystal panel and the light source.

17 Claims, 8 Drawing Sheets

LIQUID CRYSTAL DISPLAY MODULE WITH REFLECTOR HAVING RAISED LAMP GUIDE

PRIORITY CLAIM

The application claims the benefit of priority from Korean Patent Application No. 2006-0024217, filed Mar. 16, 2006, which is incorporated by reference.

BACKGROUND OF THE INVENTION

1. Technical Field

The present application relates to a liquid crystal display module.

2. Related Art

Some display devices use cathode-ray tubes (CRT). Other display devices may be flat panel displays, such as liquid crystal display (LCD) devices, plasma display panels (PDP), field emission displays, and electro-luminescence displays (ELD). LCD devices have advantages over some of the other flat panel displays. Some of these advantages may include higher resolution, lighter weight, thinner profile, a more compact size, and/or lower power supply requirements.

A LCD device includes two substrates that are spaced apart and face each other with a liquid crystal material interposed between the two substrates. The two substrates include electrodes that face each other. A voltage applied between the electrodes induces an electric field across the liquid crystal material. Alignment of the liquid crystal molecules in the liquid crystal material changes in accordance with the intensity of the induced electric field, thereby changing the light transmissivity of the LCD device. Thus, the LCD device displays images by varying the intensity of the induced electric field.

The LCD device includes a light source to display images and may be categorized according to the arrangement of the light sources. When the light source is positioned at a side of the LCD device, the LCD may be categorized as an edge type LCD device. Alternatively, when the light source is positioned below (or behind) the liquid crystal panel, the LCD device may be categorized as a direct type LCD device.

Figure 1:
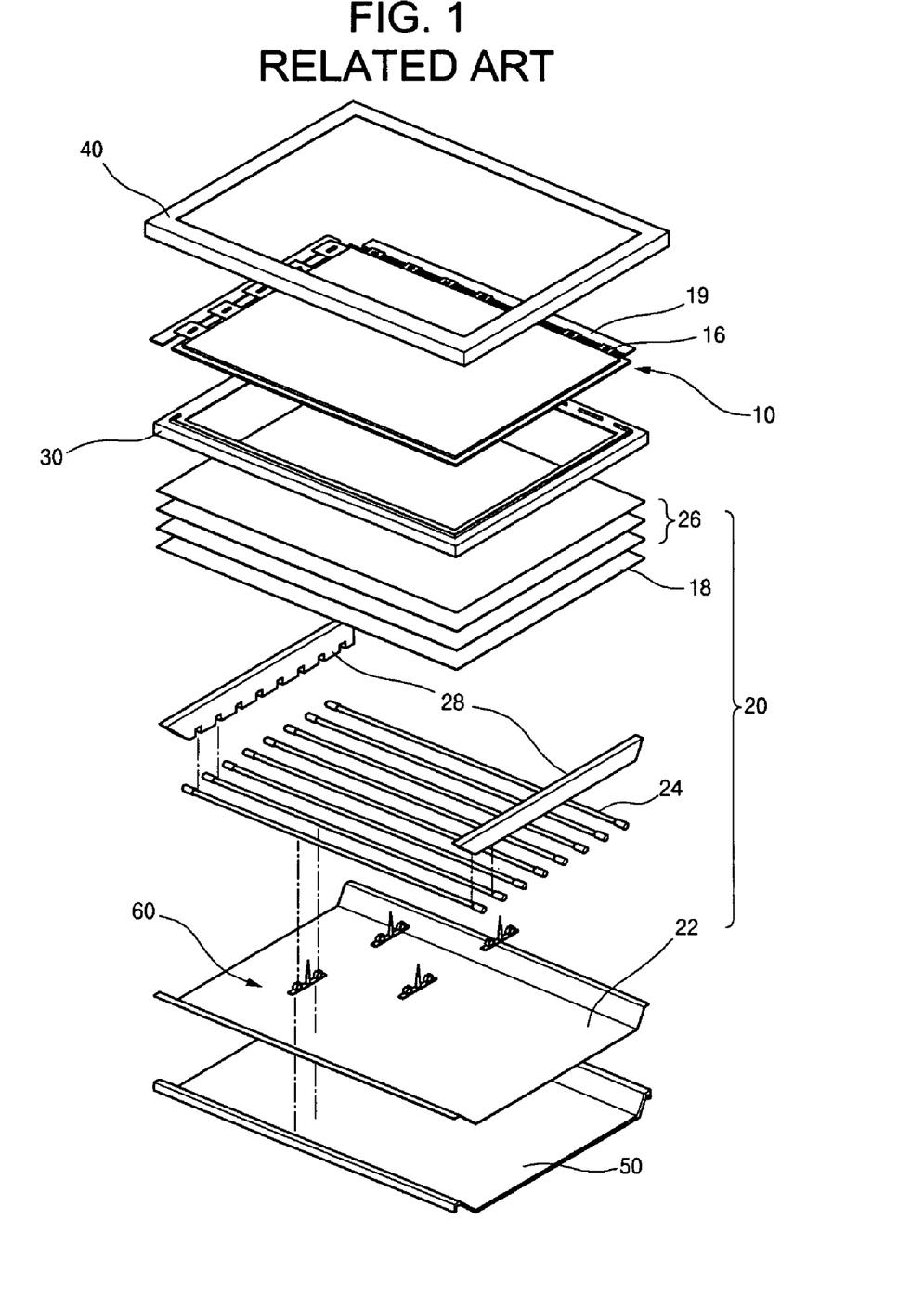
FIG. 1 is a perspective view of a direct type LCD module according to the related art.

FIG. 1 is a perspective view of a direct type LCD module according to the related art. In FIG. 1, the LCD module includes a liquid crystal panel 10, a backlight assembly 20, a main supporter 30, a top case 40 and a bottom case 50. The main supporter 30 has a rectangular frame shape and supports the backlight assembly 20 and the liquid crystal panel 10. The backlight assembly 20 includes at least one lamp 24, a reflecting sheet 22, a diffusing sheet 18, and a plurality of optical sheets 26. The plurality of optical sheets 26 may include a prism sheet. The one or more lamps 24 are arranged below and parallel to the liquid crystal panel 10. A pair of side supporters 28 fixes the ends of the lamp(s) 24. The side supporters 28 are coupled with the bottom case 50.

The top case 40 is disposed on top of the liquid crystal panel 10. The top case 40 may be pressed against and affixed to a peripheral portion of the liquid crystal panel 10. The bottom case 50 is coupled with the top case 40. A printed circuit board (PCB) 19 having driving circuits is connected to the liquid crystal panel 10 through a flexible printed circuit board (FPCB) 16.

When assembled, the diffusing sheet 18 is spaced apart from the one or more lamps 24. As the size of the LCD device increases, a size and a weight of the diffusing sheet 18 and the optical sheets 26 also increases. Accordingly, a center of the diffusing sheet 18 can sag due to the increased weight. A plurality of separate lamp guiders 60 hold up the diffusing sheet 18 and maintain a distance between the diffusing sheet 18 and the lamp(s) 24. Additionally, the lamp guiders 60 can prevent the lamp(s) 24 from swaying or may reduce the lamp(s) 24 from being broken due to an exterior impact.

However, the lamp guiders 60 surround more than half of a circumference of the lamp(s) 24 and can reduce emission efficiency of the lamp(s) 24. Accordingly, a user may notice poor system performance, which can include reduced brightness where the lamp guiders 60 are located and/or spots on the liquid crystal panel. Furthermore, because the lamp(s) 24 are fitted in the plurality of lamp guiders 60, assembling the LCD module can be complicated and can result in increased production costs. Therefore, a need exists for an improved liquid crystal display module.

SUMMARY

A liquid crystal display module displays an image on a liquid crystal panel. The liquid crystal module includes a liquid crystal panel and a backlight assembly. The backlight assembly includes a reflecting sheet having a raised portion that receives a light source and supports a diffusing sheet and/or optical sheet positioned between the liquid crystal panel and the light source.

Other apparatuses, methods, features and advantages will be or will become apparent to one with skill in the art upon examination of the following figures and detailed description. It is intended that all such additional apparatuses, methods, features, and advantages be included within this description, be within the scope of the invention, and be protected by the following claims.

BRIEF DESCRIPTION OF THE DRAWINGS

The discussion below may be better understood with reference to the following drawings and description. The components in the figures are not necessarily to scale, emphasis instead being placed upon illustrating the principles of the invention. Moreover, in the figures, like referenced numeral designate corresponding parts throughout the different views.

DETAILED DESCRIPTION OF THE PREFERRED EMBODIMENTS

Figure 2:
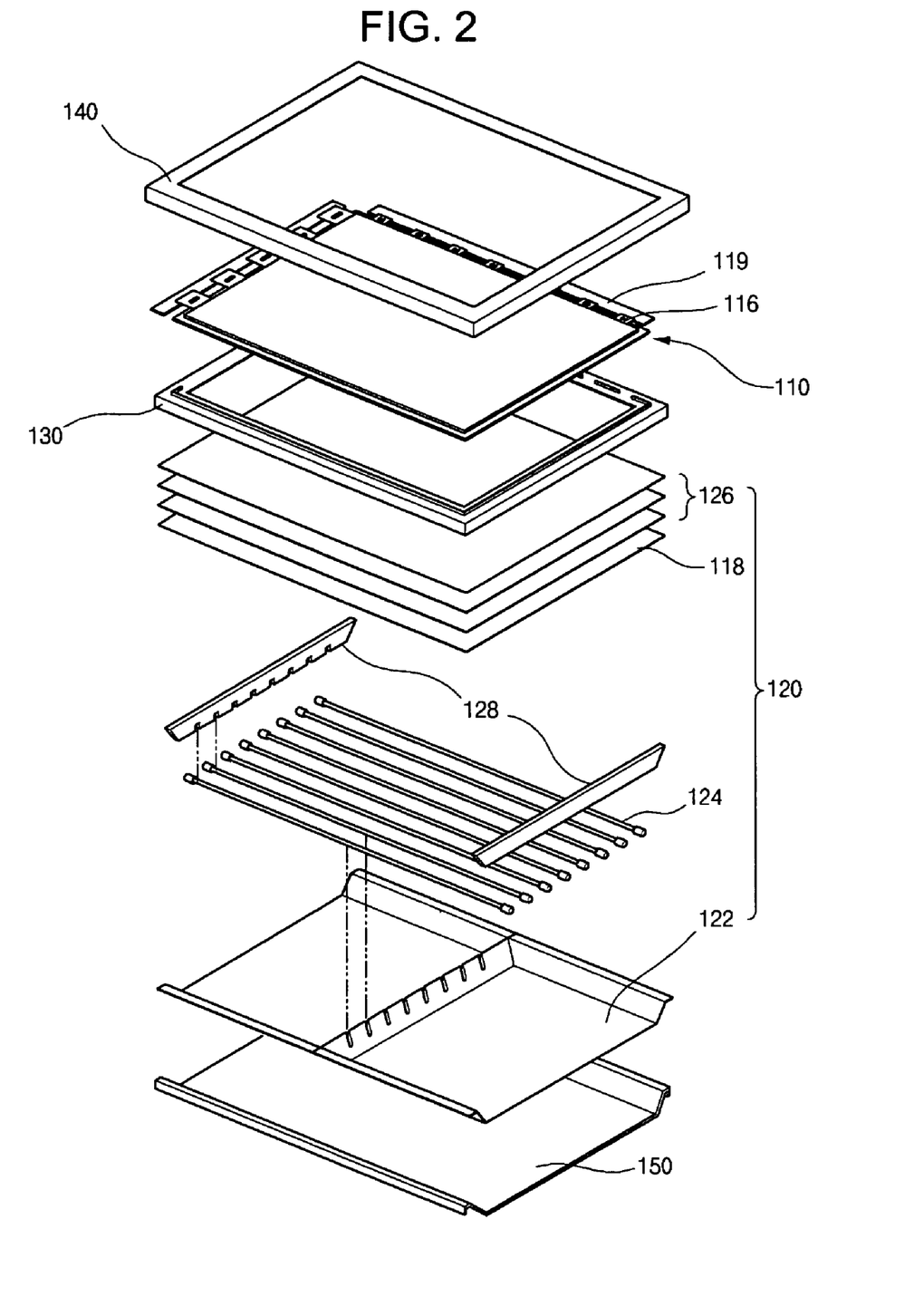
FIG. 2 is a perspective view of a LCD module.

FIG. 2 is a perspective view of a LCD module. In FIG. 2, the LCD module includes a liquid crystal panel 110, a backlight assembly 120, a main supporter 130, a top case 140 and a bottom case 150. The main supporter 130 may have a polygon shaped frame. In FIG. 2, the main supporter 130 is rectangular shaped. The main supporter 130 may support the backlight assembly 120 and the liquid crystal panel 110. Additionally, the main supporter 130 may be coupled with the top case 140.

The backlight assembly 120 may include at least one lamp 124, a reflecting sheet 122, a diffusing sheet 118, and/or a plurality of optical sheets 126. The plurality of optical sheets may include a prism sheet. In FIG. 2, the lamp(s) 124 are arranged below the liquid crystal panel 110 to supply light to the liquid crystal panel 110. The lamp(s) 24 may be arranged generally parallel to the liquid crystal panel 110, and if more than one lamp 124 is used the lamps 124 may be generally parallel to one another. In other LCD modules, the lamp(s) 124 may be arranged in different positions, such as at an edge of the LCD module, or in a generally parallel configuration that is generally perpendicular to the configuration shown in FIG. 2. A pair of side supporters 128 fixes the ends of the lamp(s) 124. The side supporters 128 may be coupled with the bottom case 150.

The top case 140 is disposed on top of the liquid crystal panel 110. The top case 140 may be pressed against and affixed to a peripheral portion of the liquid crystal panel 110. The bottom case 150 is disposed at a bottom of the LCD module. The bottom case 150 may be coupled with the top case 140. A printed circuit board (PCB) 119 which may include driving circuits may be connected to the liquid crystal panel 110 through a flexible printed circuit board (FPCB) 116.

The reflecting sheet 122 may include side portions with an edge that extends along a direction that is generally parallel to the direction of the lamp(s) 124. The side portions may include one or more bends, such that the side portion may be bent upward from the reflecting sheet 122 at a predetermined height. The side portion may include a first bent part substantially inclined to a base portion of the reflecting sheet 122, and a second bent part that is generally parallel to the base portion.

Figure 3:
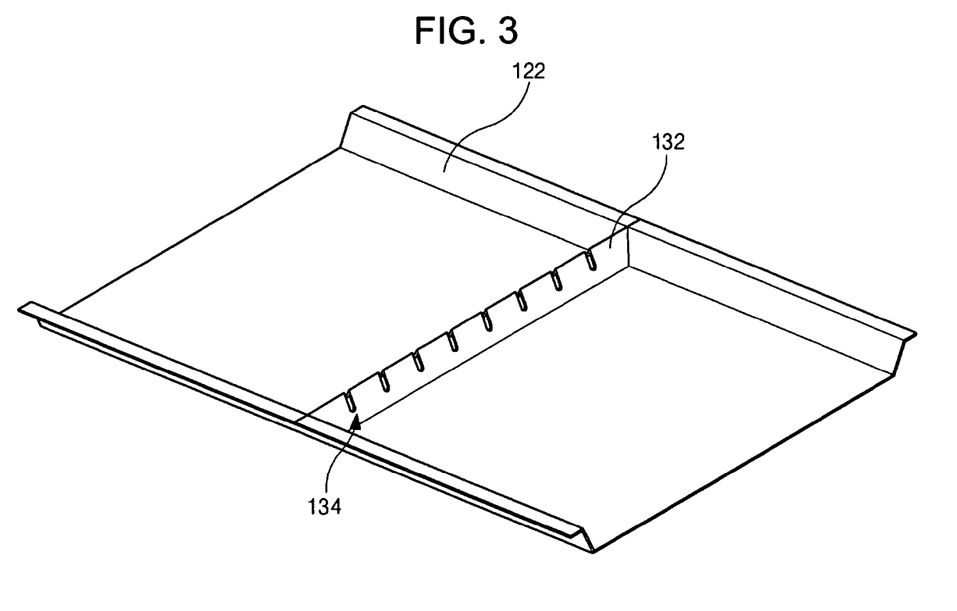
FIG. 3 is a perspective view of a reflecting sheet of FIG. 2.

In FIG. 3, the reflecting sheet 122 further includes a lamp guiding portion 132 which may protrude from the base portion. The lamp guiding portion 132 may guide the placement of the lamp(s) 124 and support the diffusing sheet 118 and/or the optical sheets 126. The lamp guiding portion 132 may extend along a direction that is generally perpendicular to the direction of the lamp(s) 124. The lamp guiding portion 132 may include at least one hole 134 that may receive a corresponding lamp(s) 124. The hole 134 may not be completely enclosed, such that a lamp(s) 124 may be inserted through the top portion of the light guiding portion 132. The one or more holes 134 may be arranged substantially parallel to and spaced apart from each other and configured to receive the lamp(s) 124.

A top of the lamp guiding portion 132 and the bent side portions support the diffusing sheet 118 and/or the optical sheets 126. The top of the lamp guiding portion 132 supports a center portion of the diffusing sheet 118 and/or the optical sheets 126, while the bent side portions support the side portions of the diffusing sheet 118 and/or the optical sheets. To support the diffusing and/or optical sheets 118 and 126, in a substantially uniform manner, the lamp guiding portion 132 may be substantially the same height as the bent side portions. The holes 134 may be configured with a depth such that a lamp 124 received in a hole 134 is appropriately spaced from the diffusing sheet 118.

The lamp guiding portion 132 may be fabricated in a variety of manners. For example, one or more folding lines may be made along a portion of a reflecting sheet 122 along in a direction that may be generally perpendicular to the direction of the lamp(s) 124. For some lamp guiding portions 132, a folding line may be made along a center of the reflecting sheet 122. Additionally, side portions may be bent prior to or after a folding line is marked on the reflecting sheet 122.

If the side portions have been bent prior to forming the lamp guiding portion 132, parts of the bent side portions near a folding line may be cut or notched. A portion of the reflecting sheet 122 near the one or more folding lines may then be raised. In some fabrications of the light guiding portion this portion of the reflecting sheet 122 may be raised by pushing one or more sides of the reflecting sheet 122 that are generally parallel to the one or more folding lines. Alternatively, tools or other forces may be used to raise a portion of the reflecting sheet 122. A lamp guiding portion 132 may be made with side surfaces substantially inclined to a flat base portion. Alternatively, a lamp guiding portion 132 may be made with side surfaces that are generally perpendicular to a flat base portion. One or more holes 134 may be formed in the lamp guiding portion 132. The one or more holes 134 may be formed through cutting, drilling, notching, or other processes that may remove a portion of the material on the lamp guiding portion 132.

Figure 4A:
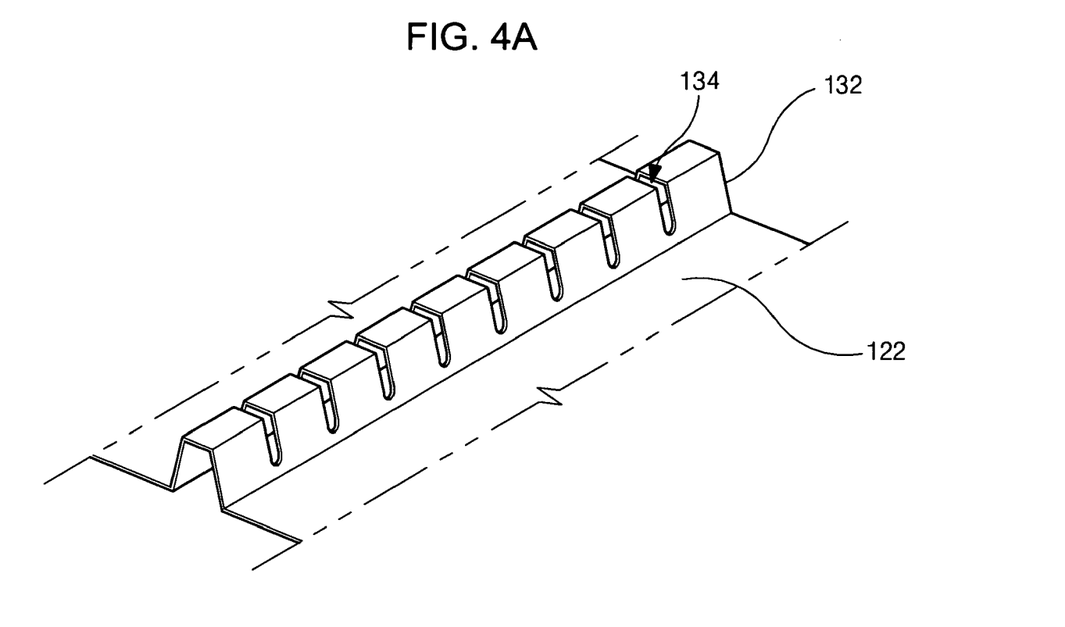
FIG. 4A is a perspective view of a lamp guiding portion that may be used in the LCD module of FIG. 2.
Figure 4B:
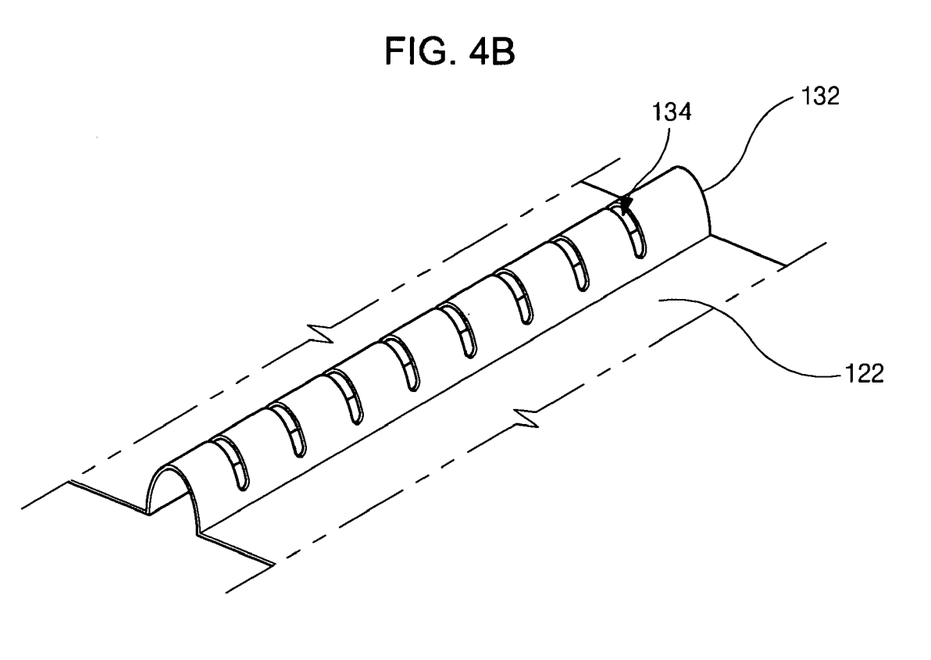
FIG. 4B is a perspective view of a second lamp guiding portion that may be used in the LCD module of FIG. 2.

The lamp guiding portion 132 of FIGS. 2 and 3 has a triangular cross sectional profile. Alternatively, the light guiding portion 132 may have a cross sectional profile including two generally non-parallel sides connected by a third side (e.g., generally bi-lateral symmetrical trapezoid shaped), as shown in FIG. 4A, or a semi-circular cross sectional profile, as shown in FIG. 4B. The lamp guiding portion 132 may also have any other appropriate polynomial shaped cross sectional profile. These other cross sectional profiles may include rectangular, square, or other shapes.

In the embodiment, the reflecting sheet is made of plastic. The holes 134 may have a predetermined width such that a lamp 124 may be substantially secured within a corresponding hole 134. For example, the hole 134 may have a width is about 1 mm to about 2 mm smaller than the diameter of a lamp 124. One or more holes 134 of a light guiding portion 132 may have varying widths. Additionally, the holes 134 may have varying shapes. In some LCD modules, one or more holes 134 of a light guiding portion 132 may have the same shape while in other LCD modules, one or more holes 134 of a light guiding portion 132 may have different shapes.

Figure 5A:
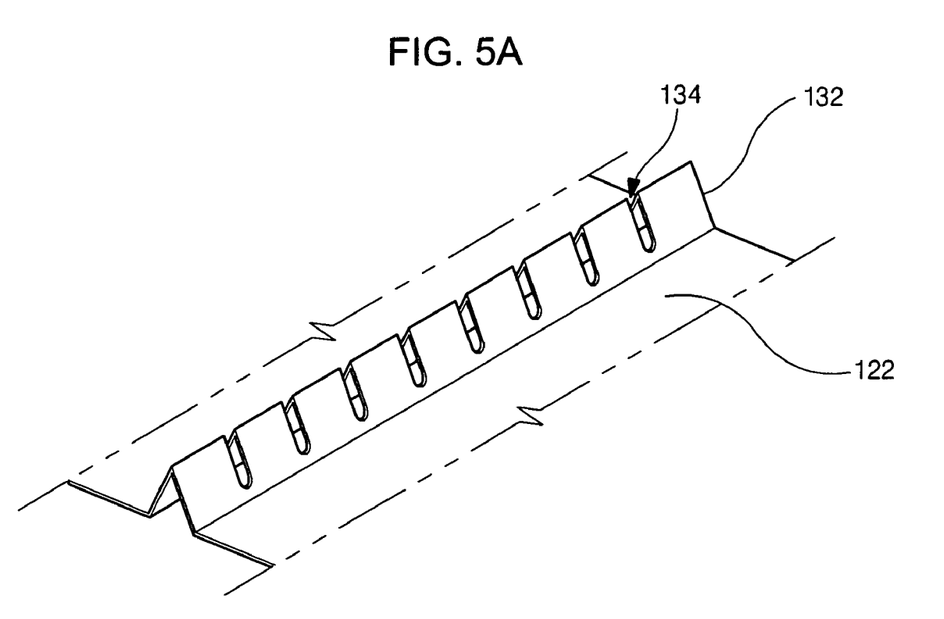
FIGS. 5A to 5C are perspective views of various hole configurations that may be used in a lamp guiding portion of the LCD module of FIG. 2.
Figure 5B:
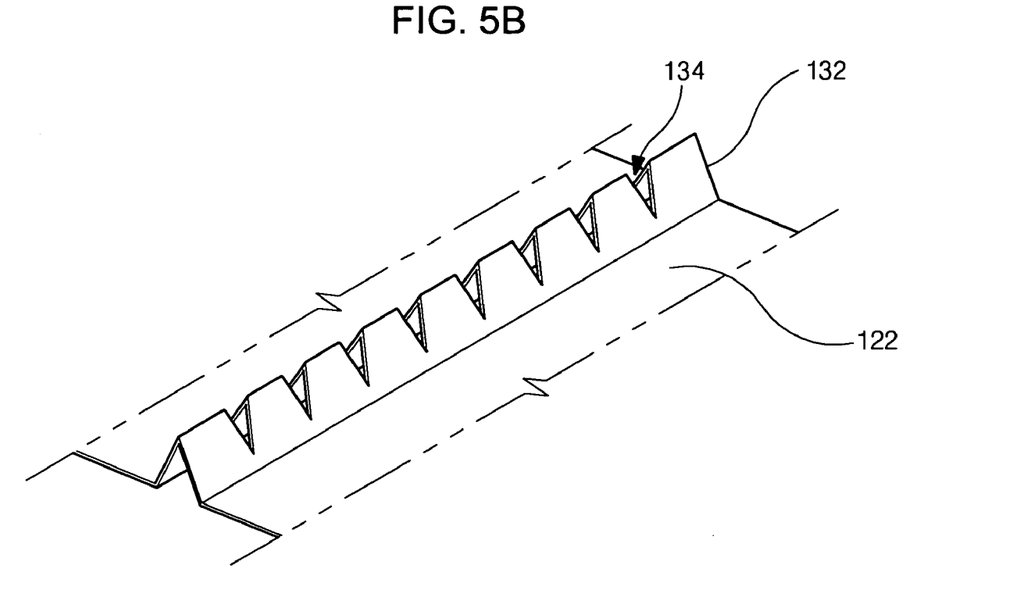

In FIGS. 5A and 5B a light guiding portion 132 has different types of holes 134. In FIG. 5A, the holes 134 include two generally parallel sides connected by a semi-circular end. The distance between the two generally parallel sides may be about 1 mm to about 2 mm smaller than the diameter of a lamp 124. In FIG. 5B, the holes 134 have a triangular shape. The distance between the generally V-shaped portions of the holes 134 may be about 1 mm to about 2 mm smaller than the diameter of a lamp 124. When a hole 134 is not completely enclosed, as shown for example in FIG. 5A or 5B, a lamp 124 may be inserted into the hole 134 in a downward vertical manner. Holes 134 that are not completely enclosed may increase the emission efficiency of a lamp 124.

Figure 5C:
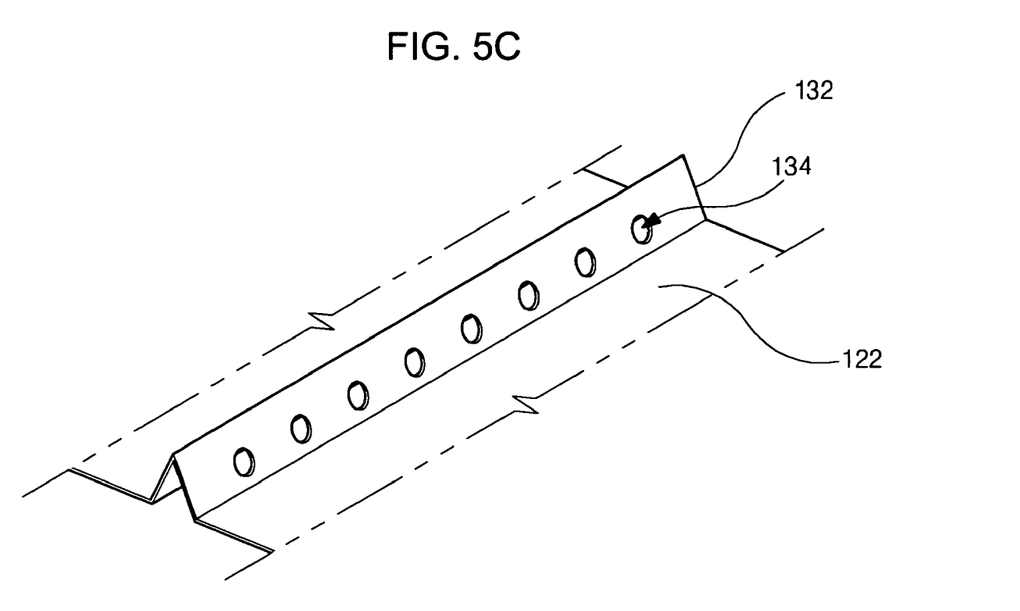

In FIG. 5C, the hole 134 has a substantially circular shape. A diameter of the hole 134 may be approximately the same as the diameter of a lamp 124. Alternatively, the diameter of the hole 134 of FIG. 5C may be slightly larger than the diameter of a lamp 124. As shown in FIG. 5C, the hole 134 may be complete (e.g., it may be spaced apart a distance from the top of the lamp guiding portion 132). When a hole 134 is spaced apart a distance from the top of the lamp guiding portion 132, a lamp 124 may be inserted into the hole 134 from one side of the hole 134 to the other side (e.g., in a horizontal manner).

The lamp guiding portion 132 may receive a lamp 124 and/or may support a diffusing sheet 118 and/or a plurality of optical sheets 126. The lamp guiding portion 132 is formed from the reflecting sheet 122 and can reduce the swaying of a lamp 124 and/or the possibility of a lamp 124 being broken from an external impact. Additionally, the use of the lamp guiding portion 132 can result in a less complex assembly of a LCD module which can reduce production costs. Further, when a hole opens towards the top of the light guiding portion 132, emission efficiency can increase resulting in better system performance.

While various embodiments of the invention have been described, it will be apparent to those of ordinary skill in the art that many more embodiments and implementations are possible within the scope of the invention. Accordingly, the invention is not to be restricted except in light of the attached claim and their equivalents.

What is claimed is:

1. A liquid crystal display module, comprising:
a liquid crystal panel; and
a backlight assembly including:
at least one lamp supplying light to the liquid crystal panel;
a diffusing sheet between the liquid crystal panel and the at least one lamp; and
a reflecting sheet comprising a raised lamp guiding portion which is made of the reflecting sheet by bending the reflecting sheet, the lamp guiding portion comprising at least one hole configured to receive the at least one lamp.

2. The module according to claim 1, wherein the reflecting sheet further comprises a bent side portion with an edge that extends along a direction that is generally parallel to the direction of the at least one lamp.

3. The module according to claim 2, wherein a height of the lamp guiding portion is substantially the same as the bent side portion.

4. The module according to claim 1, wherein the at least one hole is open toward the top of the lamp guiding portion.

5. The module according to claim 4, wherein the at least one hole is deep enough for the at least one lamp to be spaced apart from the diffusing sheet.

6. The module according to claim 1, wherein the at least one hole has a triangular shape.

7. The module according to claim 1, wherein the at least one hole has two generally parallel sides connected by a semi-circular end.

8. The module according to claim 7, wherein the reflecting sheet is made of plastic, and the two generally parallel sides are separated by a distance that is about 1 mm to about 2 mm smaller than a diameter of the at least one lamp.

9. The module according to claim 1, wherein the at least one hole comprises a substantially circular shape, the at least one hole spaced apart from the top of the lamp guiding portion.

10. The module according to claim 9, wherein a diameter of the substantially circular shape is approximately the same as a diameter of the at least one lamp.

11. The module according to claim 1, wherein the lamp guiding portion comprises inclined side surfaces.

12. The module according to claim 11, wherein the lamp guiding portion further comprises a triangular cross sectional profile.

13. The module according to claim 1, wherein the lamp guiding portion extends along a direction that is generally perpendicular to a direction of the at least one lamp.

14. The module according to claim 13, wherein the lamp guiding portion is positioned at a center of the reflecting sheet.

15. The module according to claim 1, wherein the at least one lamp is generally parallel to the liquid crystal panel.

16. The module according to claim 1, further comprising:
a main supporter supporting the liquid crystal panel and the backlight assembly;
a top case at a top of the liquid crystal display module; and
a bottom case at a bottom of the liquid crystal display module.

17. A liquid crystal display module, comprising:
a liquid crystal panel; and
a backlight assembly including:
at least one lamp parallel to the liquid crystal panel;
a diffusing sheet between the liquid crystal panel and the at least one lamp; and
a reflecting sheet comprising a raised lamp guiding portion which is made of the reflecting sheet by bending the reflecting sheet, the lamp guiding portion comprising at least one hole configured to receive the at least one lamp.

* * * * *